Figure 1:
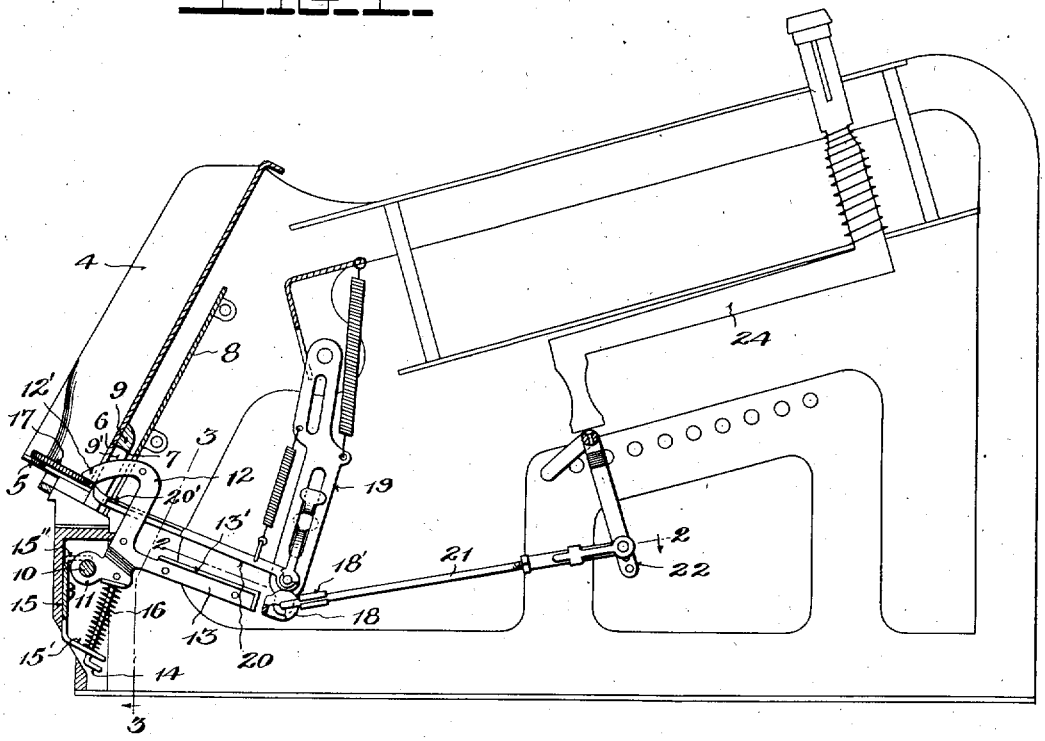

E. J. BRANDT.

COIN DELIVERY MACHINE.

APPLICATION FILED SEPT. 6, 1916.

Reissued Dec. 12, 1916. 14,227.

Witness

Chas. L. Griesbauer.

Inventor

Edward J. Brandt,

By Bacon & Williams, Attorneys

UNITED STATES PATENT OFFICE.

EDWARD J. BRANDT, OF WATERTOWN, WISCONSIN, ASSIGNOR TO BRANDT CASHIER COMPANY, OF CHICAGO, ILLINOIS.

COIN-DELIVERY MACHINE.

14,227. Specification of Reissued Letters Patent. Reissued Dec. 12, 1916.

Original No. 1,129,063, dated February 23, 1915, Serial No. 854,046, filed July 30, 1914. Application for reissue filed September 6, 1916. Serial No. 118,788.

*To all whom it may concern:*

Be it known that I, EDWARD J. BRANDT, a citizen of the United States, and resident of Watertown, in the county of Jefferson and State of Wisconsin, have invented certain new and useful Improvements in Coin-Delivery Machines; and I do hereby declare that the following is a full, clear, and exact description thereof.

Referring to coin-delivery machines of the "Brandt automatic cashier" type, the present invention has for its main object to provide against an operation of a coin-pusher of such a machine when there is less than a predetermined number of coins in a coin-tray compartment across the bottom of which said pusher is reciprocative.

A further object of the invention is the provision of means operable for locking the operating mechanism against operation when there is an absence of a coin or a predetermined number of coins in the tray, in a manner to prevent the dislodgment or tilting of a coin; and further to provide such mechanism that upon the actuation of the coin pusher the locking mechanism will be removed from engagement with the coin, thereby permitting, without interference, the downward movement of the coin in the tray after the lowermost coin has been ejected.

Other objects of the invention will be appreciated from the construction presently set forth and disclosed in the drawing.

Figure 2:
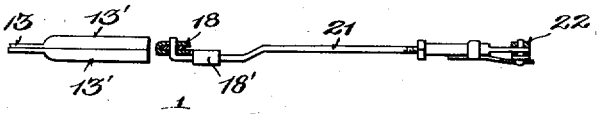
Figure 3:
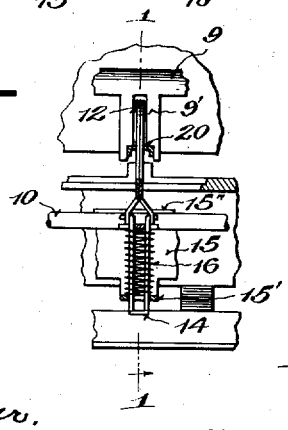

Figure 1 of the drawings represents a partly sectional elevation of an assemblage of parts in a coin-delivery machine of the type aforesaid, and it illustrates the automatic stop-mechanism herein specified; Fig. 2 is a plan view of a detail of said mechanism partly in section, indicated by line 2—2 in Fig. 1, and Fig. 3 is a partly sectional view indicated by line 3—3 in said Fig. 1.

Referring by numerals to the drawings, 4 indicates a compartment of the coin-tray of a coin-delivery machine embodying my improvements and the usual bottom slot 5 of the tray compartment is intersected by a rear wall slot 6 of said compartment in register with a slot 7 in a front plate 8 of the machine casing, said slot 6 being extended through a depending lug 9′ of a reinforcing bar 9 on the back of said tray.

A stationary rod 10 in the machine constitutes a pivot engaging an offset bearing lug 11 of an elbow-rocker constituting a stop in one position of its adjustment, and a branch 12 of the rocker is fashioned to form a nose 12′ engageable with the slots 6 and 7 aforesaid, and which at times extends into the coin-tray compartment over coin therein. The other branch 13 of the elbow-rocker constitutes an inclined lever, and said rocker is shown made of a pair of parallel pieces riveted together. When thus made, its lever branch 13 is provided with right angle lateral flanges 13′ to increase the upper bearing surface and rear end stop surface thereof. The bearing lug portions of the two piece elbow rocker are angularly bent, and stems 14 hooked therein extend down through a notch in a flange 15′ of a plate 15 fastened in the machine. The bearing lug of said rocker engages a notch in an upper flange 15″ of the plate 15, whereby it is held in place on the pivot rod 10.

Surrounding the stems 14 between the bearing lug 11 of the rocker and the lower flange of the plate 15 is a spiral spring 16 under compression and upward tilt of said rocker is limited by an opposing ledge of the machine frame.

As shown in Fig. 1, the depletion of the compartment of the coin tray has permitted an automatic upward tilt of the elbow rocker, its nose end being then over against a coin 17 in said tray compartment and its lever end in the path of a clip 18 astraddle of the lower end of a spring controlled swing arm 19 in the machine to prevent coin ejecting play of the spring controlled coin pusher 20 in pivotal connection with said arm, there being a play slot 20′ in said pusher engaged by the hook branch of the elbow rocker. A split sleeve shank 18′ of the clip 18 embraces a link rod 21 coupled to a crank 22 of another rocker 23 on which a spring controlled key plate 24 of the machine is operative.

When the coin compartment of the tray is not depleted to one or more coin, as may be predetermined, the elbow rocker is automatically tilted by the opposing column of coin to have its inclined lever-branch under the joint of the swing arm 19 and link rod 21, which joint rides on the incline of said stop, when said arm is swung to effect coin-ejecting play of the coin pusher 20. The riding of the joint aforesaid on the depressed inclined lever branch of the elbow rocker operates to effect a further back tilt of said rocker, whereby its nose 12′ is swung clear of any and all coin opposed thereto, so as not to interfere with gravity descent of said coin in the tray compartment.

The preferred construction and arrangement of parts herein shown is such that friction and power to operate the elbow rocker is minimized, and it is virtually an end of the swing arm 19 that the lever end of said rocker opposes.

It will be observed from the above construction and arrangement of parts that the stop 13 when in operative position receives the thrusts or impulse of the pusher actuated lever in a manner which prevents any possible yielding action or movement of the parts. The end 12′ of the stop lever bears downward on the coin as shown which limits or interrupts the further movement of the stop lever. It will also be observed that by the construction the free downward movement of the coins is not interferred with by the stop or locking mechanism. It is to be understood, however, that various changes can be made in the construction without departing from the general nature and spirit of the invention.

Having thus described the invention, what is claimed is:

1. In a coin delivery machine, a coin pusher swing arm, and a spring controlled elbow rocker one branch of which is an inclined lever serving alternately as a track and stop for the swing arm, its other branch being fashioned to provide a nose engageable with a rear wall slot of a coin tray compartment of the machine to at times extend into said compartment over against coin therein, the rocker being then a stop in the forward path of said swing arm.

2. In a coin delivery machine, a coin pusher swing arm, a pivot rod, and a spring controlled elbow rocker having a bearing lug loose on the rod, one branch of the rocker being an inclined lever serving alternately as a track and stop for the swing arm, the other branch of said rocker being fashioned to provide a nose engageable with a rear wall slot of a coin tray compartment of the machine to at times extend into said compartment over coin therein, the rocker being then a stop in the forward path of said swing arm.

3. In a coin delivery machine, a coin pusher swing arm, an elbow rocker, one branch of which is an inclined lever serving alternately as a track and stop for the swing arm, its other branch being fashioned to provide a nose engageable with a rear wall slot of a coin tray compartment of the machine to at times extend into said compartment over against coin therein, the rocker being then a stop in the forward path of said swing arm, and a spring opposing the rocker from below.

4. In a coin delivery machine, an elbow rocker comprising a pair of partly angularly bent and connected parallel pieces having right angle flanges at one end constituting a track and stop alternately in the path of another movable part of the machine.

5. In a coin delivery machine, a rocker stop having an inclined lever branch that serves alternately as a track and stop for a swing arm to which a coin pusher of the machine is connected, the other branch of the rocker being normally in contact with coin of a descending column in a coin tray compartment of said machine, whereby said rocker is tilted to place the lever branch thereof in track position and further tilted out of contact with said coin coincidental with forward movement of said swing arm.

6. In a coin delivery machine the combination with a coin tray part and a pusher, with mechanism for operating the pusher, means for preventing the operation of the pusher upon the absence of coin in the tray, said means comprising a pivoted stop member having a part arranged to engage the edge of the coin, and means for moving the stop member out of engagement with the coin upon the actuation of the pusher in a direction to eject a coin.

7. In a coin delivery machine the combination with a coin receiving tray member and coin ejecting mechanism, of means controlled by the absence of a coin from the tray for preventing the operation of the ejecting mechanism, and means for causing the said preventing mechanism to move from engagement with the coin in the tray member by and upon the operation of the ejector mechanism in a direction to eject a coin.

8. In a coin delivery machine the combination with a coin tray element of ejector mechanism, means for preventing the operation of the ejector mechanism upon the absence of coin in the tray element, and means operable upon and by the movement of the ejector mechanism for positioning the preventing mechanism out of engagement with the coin during the operation of the ejector mechanism.

9. In a coin delivery machine the combination with a coin tray element and a reciprocating ejector mechanism comprising a swinging member, of means for preventing the swinging of said member upon the absence of coin in the tray, and means operated by the swinging element for removing the said preventing means from engagement with a coin during the operation of said swinging element.

10. In a coin delivery machine the combination with a tray element and a coin pusher of a swinging support for the pusher, key mechanism for operating the support, and a stop interposed in the path of the swinging support during the absence of coin in the coin tray element, and spring mechanism for operating the stop in one direction.

11. In a coin delivery machine the combination with a tray element and a pusher mechanism of a spring actuated stop mechanism having an extended part entering the tray element, and means for removing the extended part from the tray by and upon the operation of the pusher mechanism in a direction to eject a coin.

12. In a coin delivery machine the combination with a tray element and a pusher mechanism, of a rocking lever having one end arranged to enter the tray upon the absence of coin and having an extension arranged to be engaged by the pusher mechanism for moving the tray entering end of the lever from its position in line with the coin in the tray upon the forward movement of the pusher mechanism.

13. In a coin delivery machine the combination with a tray and pusher mechanism, of a tiltable stop lever, and means for engaging the stop lever for tilting the same out of engagement with the coin in the tray by and upon the ejecting movement of the pusher mechanism.

14. In a coin delivery machine having a coin tray and an ejector mechanism, a swinging locking member for the ejector mechanism, and means for operating the locking member out of operative position by and upon the ejecting movement of the ejector mechanism.

EDWARD J. BRANDT.